March 20, 1962 P. M. McPHERSON 3,026,435
ULTRAVIOLET LAMP
Filed Sept. 16, 1960 5 Sheets-Sheet 1

INVENTOR.
Paul M. McPherson
BY
Morse & Altman
ATTORNEYS

INVENTOR.
Paul M. McPherson
BY Morse & Altman
ATTORNEYS

March 20, 1962 P. M. McPHERSON 3,026,435
ULTRAVIOLET LAMP
Filed Sept. 16, 1960 5 Sheets-Sheet 4
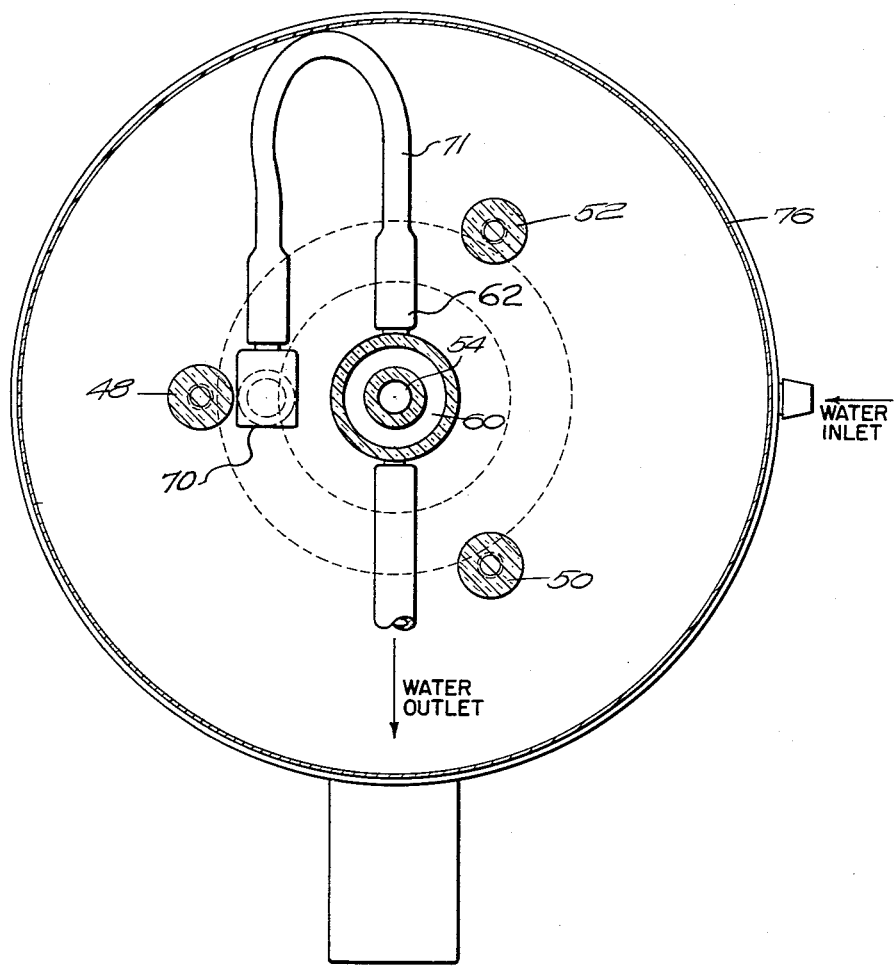
F I G. 4
INVENTOR.
Paul M. McPherson
BY
Morse & Altman
ATTORNEYS March 20, 1962  P. M. McPHERSON  3,026,435
ULTRAVIOLET LAMP
Filed Sept. 16, 1960  5 Sheets-Sheet 5

INVENTOR.
Paul M. McPherson
BY Morse & Altman
ATTORNEYS

United States Patent Office 3,026,435
Patented Mar. 20, 1962

3,026,435
ULTRAVIOLET LAMP
Paul M. McPherson, Acton, Mass., assignor to McPherson Instrument Corporation, Acton, Mass., a corporation of Massachusetts
Filed Sept. 16, 1960, Ser. No. 56,466
12 Claims. (Cl. 313—22)

The present invention relates to the generation of ultraviolet radiation and, more particularly, to a high power ultraviolet lamp for use in conjunction with spectroscopic apparatus.

That part of the electromagnetic spectrum having wavelengths shorter than 2,000 A. is frequently called the vacuum ultraviolet region because the high absorption of such wavelengths by most gases often requires the evacuation of spectroscopic apparatus utilizing such wavelengths. Thus, a typical spectrograph for use in this region comprises an entrance slit through which ultraviolet radiation is transmitted from a source, a diffraction grating for dispersing this radiation from the entrance slit into a spectrum, an exit slit for transmitting a selected part of this spectrum from the diffraction grating to desired auxiliary apparatus and means for evacuating the diffraction grating chamber. The lamp for such a spectrograph generates ultraviolet radiation by applying a high potential across an ionizable gas in a tube that is sufficiently narrow to concentrate the resulting radiation in a narrow beam. In order to maximize the energy transmitted through the slit from the lamp, this tube is oriented perpendicularly to the plane of the slit so that emission of the beam in an axial direction from an end of the tube is effected. In the 1000 to 2000 A. region, it may be practicable to confine the gas within an envelope which efficiently transmits ultraviolet radiation. However, in the region below 1000 A., high absorption by most solid materials renders the design of a suitable envelope impracticable. Accordingly, it is necessary in this short wavelength region to transmit energy directly from the plasma of the lamp through the slit of the spectrograph. Furthermore, because of a requiremen for the generation of ultraviolet radiation of desired intensity, high potential difference is necessary across the plasma and great heat is produced in the plasma. The present invention contemplates a simplified construction of the foregoing type characterized by efficient heat exchange for preventing excessive heating of the lamp, effective mounting and shielding of components to facilitate handling and eliminate hazard and limited mechanical communication between the evacuated spectrograph chamber and the pressurized plasma tube in order to minimize leakage of plasma from the lamp to the spectrograph.

Objects of the present invention are: to provide a combination of the foregoing type wherein the conduit defining the optical path for radiation from the plasma is sealed directly to the face defining the slit of the spectrograph in such a way as to confine mechanical communication between the spectrograph and the lamp to the cross-sectional area of the slit; to provide a lamp for an apparatus of the foregoing type in which all components are mounted on a grounded electrode and within a grounded shroud for facility and safety; and to provide a lamp of the foregoing type in which the plasma tube, which is composed of an electrical insulator, is mounted between the anode and the cathode, which are composed of electrical conductors, in such a way that the grounded electrode and tube may be water cooled and the "hot" electrode may be air cooled.

Other objects of the present invention will be obvious and will in part appear hereinafter.

For a fuller understanding of the nature and objects of the present invention, reference should be had to the following detailed description taken in connection with the accompanying drawings wherein:

FIG. 4 is a cross-sectional view of the lamp of FIG. 1, the section being taken substantially along the line 4—4 of FIG. 1;

Figure 1:
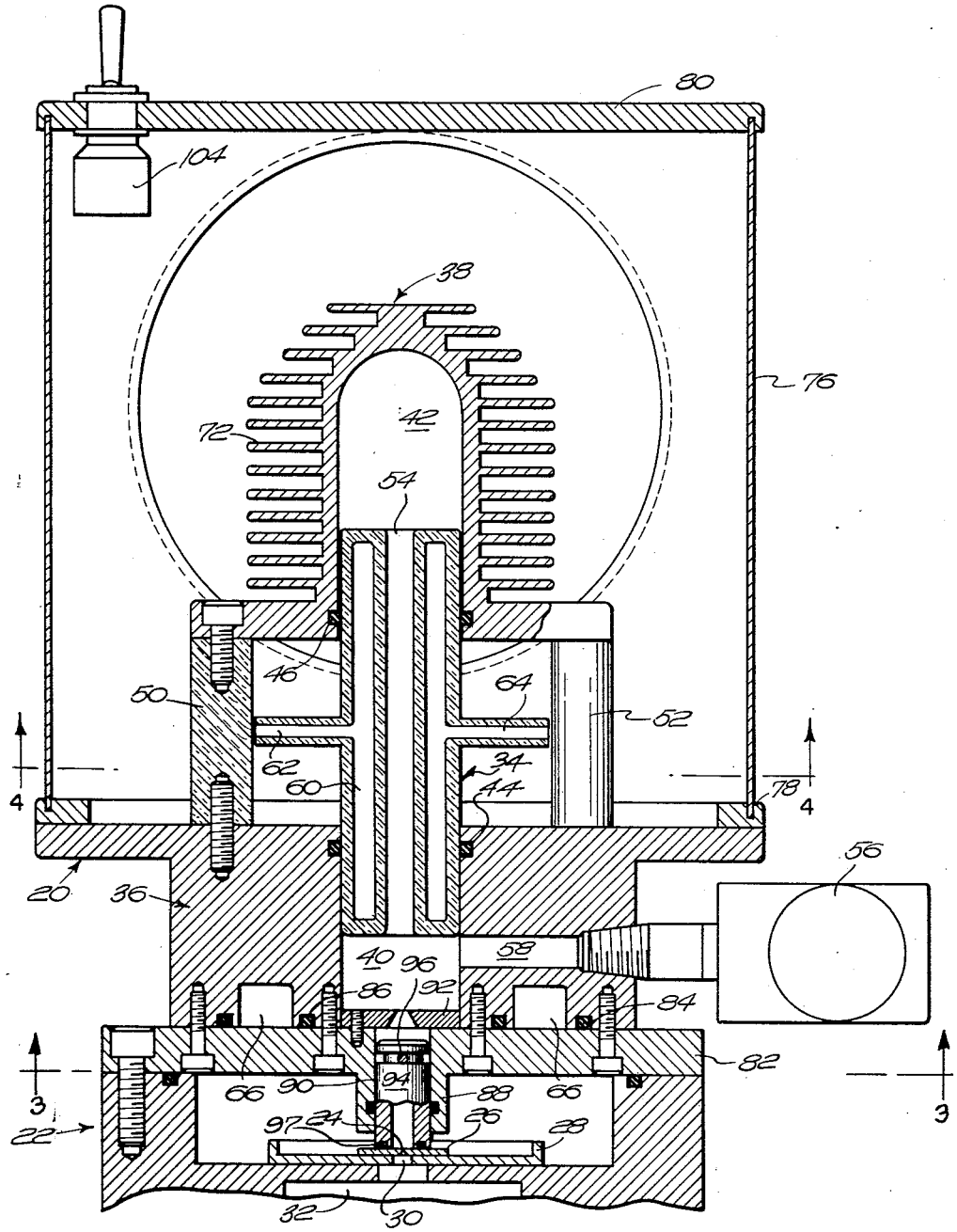
FIG. 1 is a top plan view, partly broken away, of a vacuum ultraviolet lamp embodying the present invention, shown in conjunction with a fragment of a spectrometer.
Figure 2:
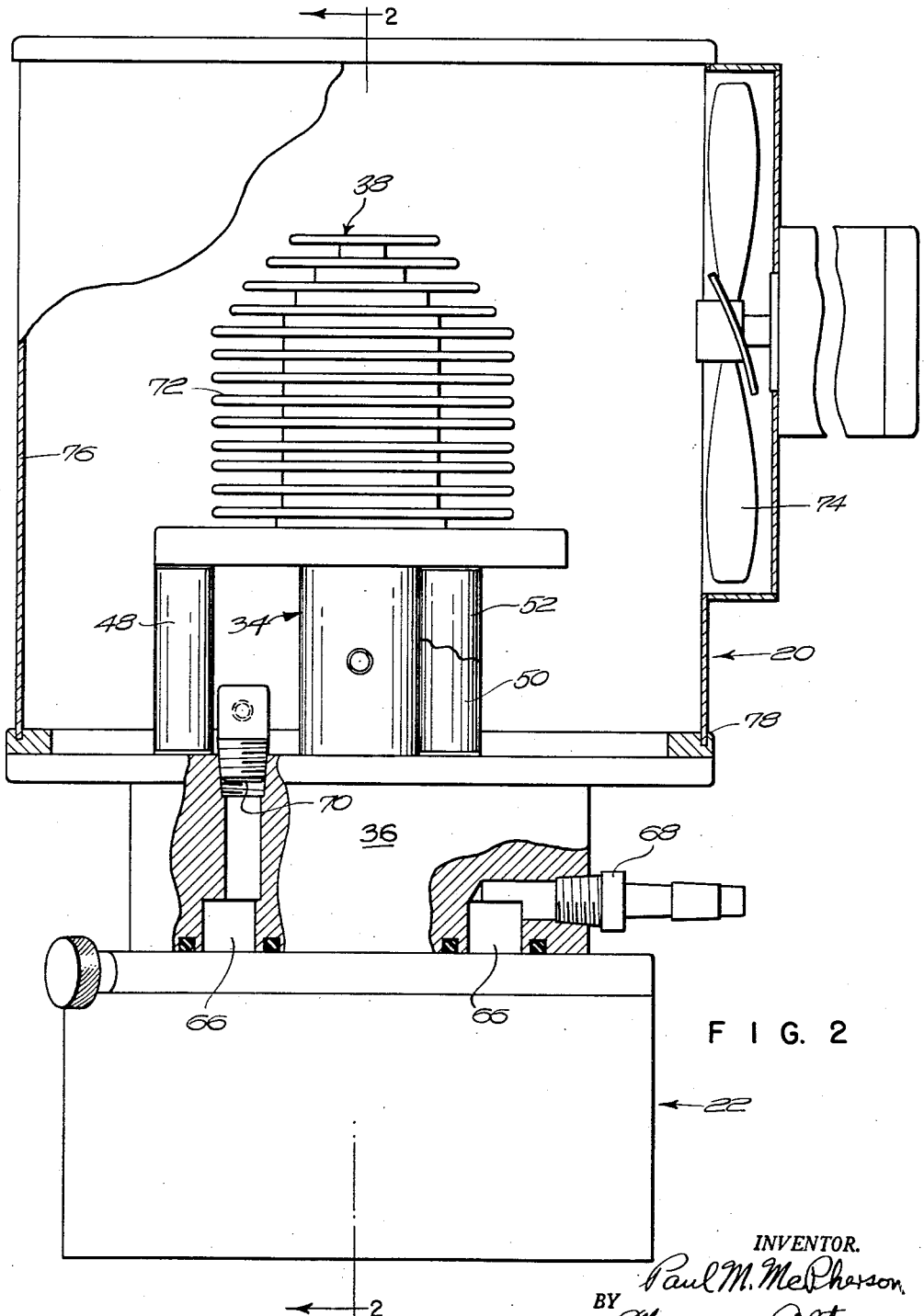
FIG. 2 is a vertical cross-sectional view, partly broken away, of the lamp of FIG. 1, the section being taken substantially along the line 2—2 of FIG. 1.
Figure 3:
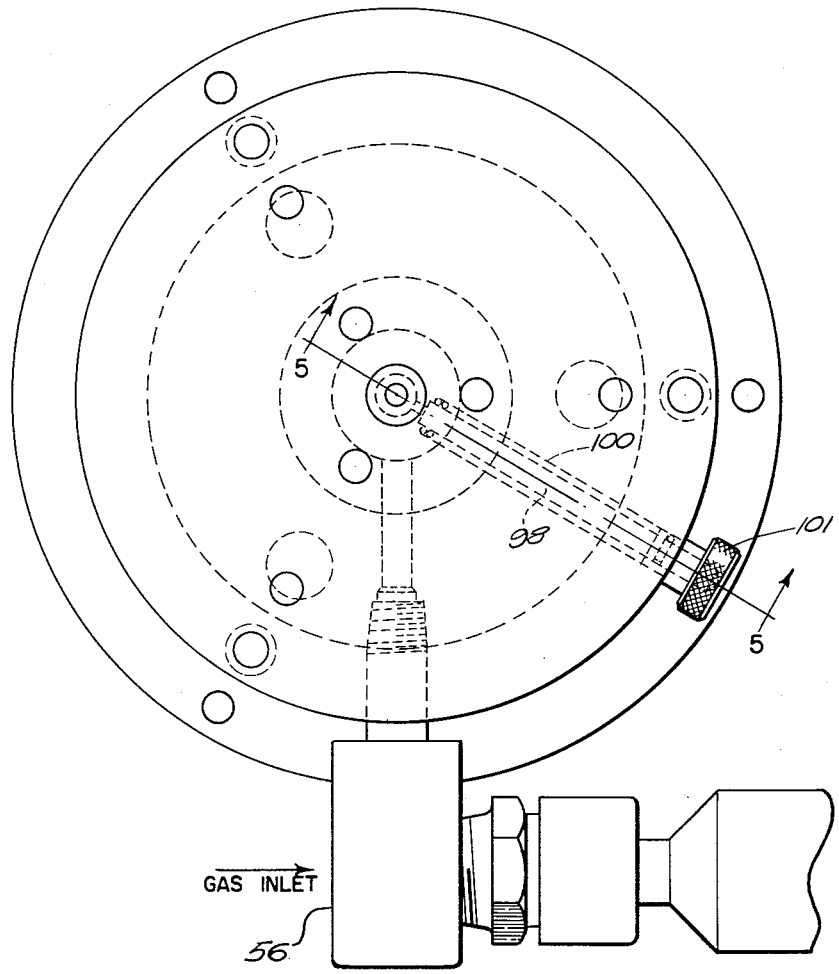
FIG. 3 is a cross-sectional view, partly broken away, of the lamp of FIG. 1, the section being taken substantially along the line 3—3 of FIG. 1.
Figure 6:
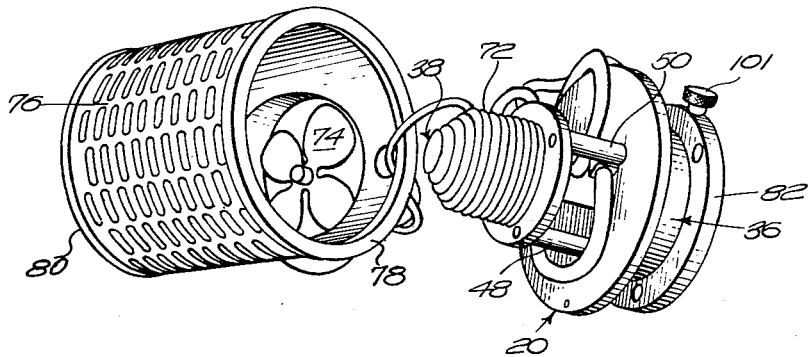
FIG. 6 is a perspective, disassembled view of the lamp of FIG. 1.

Generally the illustrated embodiment of the present invention, with reference to FIGS. 1, 2 and 6, comprises a source 20 of ultraviolet light in conjunction with a spectrograph 22 that includes: an entrance slit 24 through which ultraviolet radiation from lamp 20 enters; a diffraction grating (not shown) of conventional design that disperses the radiation from the entrance slit into a spectrum; an exit slit (not shown) of conventional design through which a selected portion of the spectrum is transmitted from the grating; and a vacuum pump (not shown) of conventional design for maintaining the interior of the spectrograph at reduced pressure. The slit is shown in FIG. 1 at 24 as being provided by a plate 26 that is mounted upon a support 28. Support 28 provides an aperture 30, through which radiation from slit 25 may enter the evacuated interior 32 of the spectrograph.

Generally lamp 20 includes an ultraviolet source in the form of a capillary tube 34 that extends between an anode 36 and a cathode 38. Typically, capillary tube 34 ranges from ⅛ to ½ inch in diameter. Anode 36 is provided with a central bore 40, into which snugly projects one end of capillary tube 34. Cathode 38 is provided with a central bore 42, into which snugly projects the other end of capillary tube 34. The seals between the outer periphery of capillary tube 34 and the inner periphery of bore 40 and between the outer periphery of capillary tube 34 and the inner periphery of bore 42 is ensured by rubber-like O-rings 44 and 46.

Cathode 38 is mounted upon anode 36 by three insulating posts 48, 50 and 52, which electrically isolate cathode 38 from anode 36. An ionizable gas, preferably a noble gas such as argon or an inert gas such as nitrogen, is introduced into the axial capillary orifice 54 of capillary tube 34 through a fitting 56 and a bore 58 in cathode 36 that communicates with bore 40 of cathode 36. Bores 40 and 42 of anode 36 and cathode 38 are designed to contain a substantial quantity of this gas. The arrangement is such that the pressure of the gas within capillary orifice 54 is maintained constant by the pressure sinks constituted by bores 40 and 42. A suitable pressure control (not shown) is associated with fitting 56 in order to maintain the pressure of the gas within the system constant notwithstanding its escape from the system in minute quantities through slit 24 in a manner to be described below.

Capillary tube 34 is shaped to include a water jacket 60 (FIG. 4), through which water is circulated between an inlet 62 and an outlet 64. Water jacket 60 serves to maintain capillary tube 34 at a predetermined temperature notwithstanding the heat generated by the plasma within capillary orifice 54. This plasma also transfers heat to anode 36 and cathode 38. Anode 36 is provided with an annular bore 66 into which water is fed through a fitting 68 and from which water is fed through a fitting 70. Fitting 70 communicates with inlet 62 of capillary water jacket 60 through a tube 71 so that both anode 36 and water jacket 60 circulate the same stream of water. Cathode 38, which because of its extremely low potential must be electrically isolated, is provided with a multiplicity of fins 72 that are air cooled by a suitable motor driven fan 74. Motor driven fan 74 is mounted on a cage 76 of generally cylindrical configuration. One end of cage 76 is affixed to anode 36 as at 78 and the other end of cage 76 is closed by a cap 80. Cage 76 is articulated in order to permit free flow of air through fins 72. Anode 36, cage 76 and cap 80 completely surround cathode 38 in such a way as to prevent manual contact of cathode 38 when the lamp is in operation. Anode 36, cage 76 and cap 80 are grounded so that they may be freely handled without danger.

Figure 5:
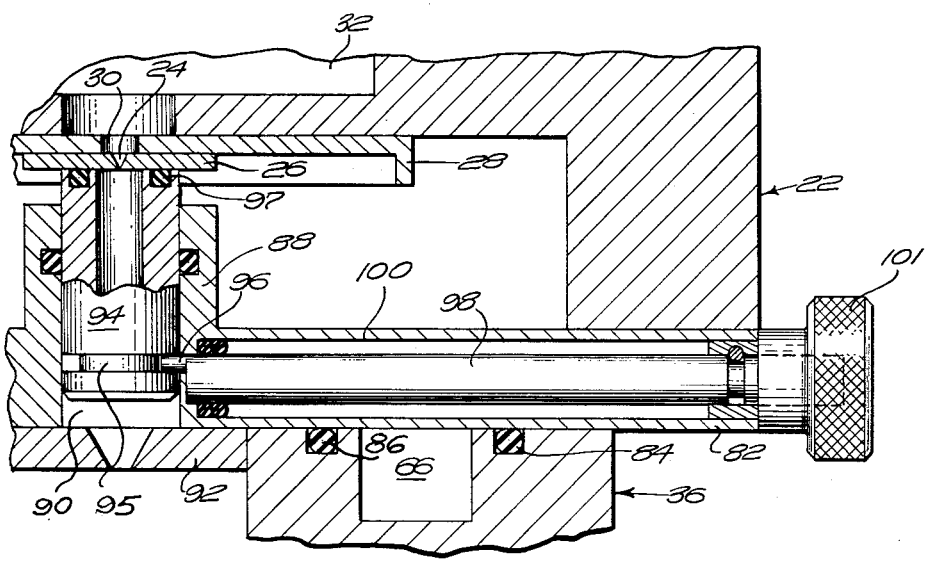
FIG. 5 is an enlarged, fragmentary, partially crossed-section view of a part of the lamp of FIG. 1.

As is best shown in FIG. 5, anode 36 abuts against a plate 82, to which it is sealed by concentric O-rings 84 and 86. Plate 82 is provided with an outwardly projecting hub 88. A central bore 90 extends through hub 88 and plate 82. At the center of plate 82 is affixed an aperture disk 92. Projecting toward plate 26, which provides slit 24, from within bore 90 is a hollow tubelet 94. The outer periphery of tubelet 94 contacts the face of plate 26 and is sealed thereto by means of a suitable O-ring 97. The rearward end portion of tubelet 94 is provided with a peripheral slot 95. Projecting into slot 95 is a finger 96 that extends from and is eccentric to a shaft 98. Shaft 98 is rotatable in a bore 100. By rotating the knurled head 102, which is attached to the outer end of shaft 98, finger 96 is caused to bear against slot 95 in such a way as to cam the outer end of tubelet 94 against plate 26.

In operation, fan 74 is energized by such means as a switch 104. The pressure of the ionizable gas within bore 40 of anode 36, capillary orifice 54 and bore 42 of cathode 38 is built up. Spectrograph cavity 32 is evacuated. Water is flow through inlet 68 of anode 36, from outlet 70 to inlet 62, through water jacket 60 and from outlet 64. A negative potential of from 10,000 to 30,000 volts, and preferably of about 15,00 volts, is applied to cathode 38. In consequence, a discharge occurs through the gas within capillary orifice 54 in such a way that heavy cations are directed toward cathode 38 thereby rendering the pressure toward cathode end of capillary orifice 54 higher than the pressure at the anode end thereof. The slight leakage of gas through slit 24 into the evacuated chamber 32 of the spectrograph is minimized by tubelet 94 which abuts against the face of plate 26. Typically, the pressure in the spectrograph is maintained at an order of a few microns of mercury and the pressure in the lamp is maintained at an order of a few millimeters of mercury.

The present invention thus provides a simply designed ultraviolet lamp that is capable of directing intense ultraviolet radiation directly from a plasma through the slit of an evacuated spectrograph without an intermediary window. The intense radiation is made possible by a high potential difference across the plasma and an efficient cooling system. All of the components are mounted simply in such a way as to eliminate danger by virtue of a grounded cage that completely envelops a low potential cathode and that is mounted on a grounded anode.

In alternative embodiments of the present invention, the polarity of the electrodes are reversed such that electrode 36 is the cathode at ground and electrode 38 is the anode at elevated potential or an alternating current is applied across the electrodes. In another alternative embodiment of the present invention, the ionizable gas is fed into the system through bore 42 rather than bore 40.

Since certain other changes may be made in the above described embodiment of the present invention without departing from the scope of the present invention, it is intended that all matter contained in the above description or shown in the accompanying drawings shall be interpreted in an illustrative and not in a limiting sense.

What is claimed is:

1. In combination with spectroscopic means including an evacuated chamber, an entrance slit communicating therewith through which ultraviolet radiation may be transmitted, a dispersion means for dispersing the radiation from the entrance slit into a spectrum and an exit slit communicating for selectively transmitting a restricted portion of said spectrum, an ultraviolet lamp comprising first electrode means providing a seat, second electrode means providing a seat, spacing means between said second electrode means and said first electrode means for mechanically connecting and electrically isolating said second electrode means and said first electrode means, a tube providing a central orifice, one extremity of said tube being received hermetically by said seat of said first electrode means, the other extremity of said tube being received hermetically by the seat of said second electrode means and means for introducing a gas into said central orifice.

2. In the combination of claim 1, a water jacket surrounding said tube.

3. In the combination of claim 2, said second electrode means providing a duct, and a coolant for circulation through said duct and said water jacket.

4. In the combination of claim 3, a cage enveloping said first electrode means and connected to said second electrode means, said second electrode means and said cage being grounded, said first electrode means being at a potential other than ground.

5. In the combination of claim 1, a reciprocable hollow sleeve communicating with said bore of said second electrode means and means for wedging said reciprocable sleeve against said entrance slit of said spectroscopic means.

6. In combination with spectroscopic means including an evacuated chamber, an entrance slit communicating therewith through which ultraviolet radiation may be transmitted, a dispersion means for dispersing the radiation from the entrance slit into a spectrum and an exit slit communicating for selectively transmitting a restricted portion of said spectrum, an ultraviolet lamp comprising first electrode means providing a seat, second electrode means providing a seat, spacing means between said first electrode and said second electrode means for mechanically connecting and electrically isolating said second electrode means and said first electrode means, a tube providing a central orifice and a surrounding water jacket, said water jacket being composed of an insulating material, one extremity of said water jacket being received hermetically by said seat of said first electrode means, the other end of said water jacket being received hermetically by said seat of said second electrode means, means for introducing a gas into said central orifice, said second electrode means providing a duct means for circulating coolant through said duct and through said water jacket, fins on said second electrode means, and means for blowing air over said fins.

7. In the combination of claim 6, said first electrode means being at a potential other than ground, and a cage enveloping said first electrode means and connected to said second electrode means, said second electrode means and said cage being grounded.

8. An ultraviolet lamp comprising first electrode means providing a seat, second electrode means providing a seat, spacing means between said second electrode means and said first electrode means for mechanically connecting and electrically isolating said second electrode means and said first electrode means, and a tube providing a central orifice, one extremity of said tube being received hermetically by said seat of said first electrode means, the other extremity of said tube being received hermetically by said seat of said second electrode means, means for introducing a gas into said central orifice, said first electrode means being at a potential other than ground, and a cage enveloping said first electrode means and connected to said second electrode means, said second electrode means and said cage being at ground potential.

9. The ultraviolet lamp of claim 8, wherein a water jacket surrounds said tube.

10. The ultraviolet lamp of claim 9, wherein one of said electrode means provides a duct, and a coolant is provided for circulation through said duct and said water jacket.

11. An ultraviolet lamp comprising first electrode means, second electrode means and tube means extending therebetween, one of said electrode means providing an opening therethrough communicating with said tube means, means for introducing a gas into said tube means, means for applying a potential between said first electrode means and said second electrode means, means for mounting a sleeve, means for reciprocal motion in communication with said opening, gasket means at the end of said sleeve means remote from said opening, and means for reciprocating said sleeve means.

12. The ultraviolet lamp of claim 11 wherein said gasket means is an O-ring.

No references cited.